May 10, 1960 W. H. McLELLAN 2,936,419
GALVANOMETER
Filed Nov. 16, 1956

INVENTOR.
WILLIAM H. MCLELLAN
BY
Christie, Parker & Hale
ATTORNEYS

United States Patent Office

2,936,419
Patented May 10, 1960

2,936,419

GALVANOMETER

William H. McLellan, Pasadena, Calif., assignor to Bell & Howell Company, Chicago, Ill., a corporation of Illinois Application November 16, 1956, Serial No. 622,664

6 Claims. (Cl. 324—154)

This invention relates to a method for winding electrical conductors to form an electrical coil, as well as an improved galvanometer structure utilizing the coil formed by the method.

A typical galvanometer comprises a lightweight fine wire coil held in suspension between a pair of stretched wires or ribbons respectively anchored at opposite ends to an enclosing galvanometer case. The suspension means defines the axis of rotary motion of the coil and supports a small mirror which is generally symmetrically arranged about this axis for deflection responsive to rotation of the coil. A window in the galvanometer case aligned with the mirror enables incidence and reflection of the light beam at the mirror for sensing coil displacement. A pair of pole pieces are mounted through opposite walls of the case to define a narrow gap interiorly of the case and in which the coil is located. The pole pieces extend outwardly of the case for suitable engagement with magnet means as of an oscillograph.

The coil suspension means in the form of conductive wire or ribbon provides electrical leads to the coil, one suspension means conventionally being anchored to a terminal post sealed through an end of the galvanometer case and providing one external contact. The other suspension means is generally anchored at the other end of the galvanometer case. In practice a fine wire lead may be attached to the other suspension means and carried upwardly in the casing and through a side wall thereof into a terminal housing wherein it is mechanically held in contact with a second terminal post.

The principle of operation of a galvanometer of this type, together with its mode of use, is thoroughly familiar in the art. See "Introduction to Electricity and Optics," by Nathaniel H. Frank, published by McGraw-Hill (1940), at pages 93 and 94.

A problem in the design of a galvanometer is to obtain the highest current sensitivity possible for a given undamped natural frequency, a given per unit critical damping factor, and a given external shunt resistance value. An approximate relationship is given by the expression:

$$S^2 = \frac{H(R_g + R_{ext})}{K f_n}$$

where $S$ = undamped current sensitivity, deflection per unit current
$H$ = damping factor
$K$ = torsional stiffness of the suspension
$f_n$ = undamped natural frequency of the galvanometer
$R_g$ = galvanometer resistance
$R_{ext}$ = external shunt resistance Usually $H$, $f_n$, and $R_{ext}$ are given so that the only factors left are $S$, $K$, and $R_g$. Since it is desired that $S$ be high, $K$ should be low and $R_g$ high.

The undamped natural frequency of a galvanometer coil is determined by the formula:

$$f_n = \frac{1}{2\pi}\sqrt{\frac{K}{I}}$$

where $K$ = the stiffness of the suspension spring, and
$I$ = the inertia

An examination of the undamped natural frequency formula shows that the undamped natural frequency is proportional to the square root of the spring stiffness $K$ and inversely proportional to the square root of the inertia $I$. However, in the construction of galvanometers, the spring stiffness $K$ has a practical low limit. Therefore, a lower stiffness to inertia ratio $$\frac{K}{I}$$

which will give a lower undamped natural frequency galvanometer may only be obtained by increasing the inertia $I$.

In practice, low frequency galvanometer coils are usually constructed of a few turns of relatively large diameter wire to give a high inertia and the desired torque. As a result the coil rseistance is low, contrary to what is desired. Also, the large wires permit eddy current sufficient to give measurable eddy current damping which adds to the normal electromagnetic damping. To compensate for this the sensitivity $S$ must be reduced slightly, usually by reducing the number of turns of the coil. In order to maintain the high inertia, larger wire must be used. This again increases the eddy current damping effect and causes the coil resistance to be even lower. The sensitivity is further reduced until the desired damping is obtained. This is the normal design approach and results in a lower value sensitivity than was originally expected.

To solve this problem I wind the coil using many turns of much smaller diameter wire. A portion of the turns are connected so that the torque produced by these turns opposes the torque produced by the remainder of the turns. The total coil inertia and net torque are made the same as that obtained from a coil of fewer turns of larger diameter wire. The smaller diameter wire decreases the eddy current damping effect and increases the galvanometer resistance $R_g$. This method of providing higher galvanometer resistance is accomplished without the use of additional space and without increasing the capacitance between the terminals and the case of the galvanometer.

The particular method contemplated is one which permits a coil to be constructed without resorting to reverse winding or the winding of two separate coils. The method is to wind a length of wire in the same direction several times. The wire is then severed at a point intermediate its ends to provide two wires. The original lead-in wire is then connected to that portion of the severed wire leading to the original lead-out wire. The other portion of the severed wire may then be used as the lead-in wire. By using this method of winding the coil, a difference of potential applied across the lead-in wire and the lead-out wire will cause a net working turns of the coil equal to the difference of the length of the wire from one end to the junction, when compared to the length of the wire from the junction to the other end. The resistance $R_g$ is thus increased as desired and yet the inertia, $I$, is maintained at a high value.

The invention also contemplates a new galvanometer structure which uses a galvanometer coil constructed in accordance with my new method. That portion of the severed winding which leads to the coil output lead is connected by bonding or other conventional means to the original lead-in wire. The other portion of the severed turn is connected to the upper suspension means at a point adjacent its lower end.

The invention will be more clearly understood with reference to the following detailed description thereof as taken in conjunction with the accompanying drawings, in which.

Figure 1:
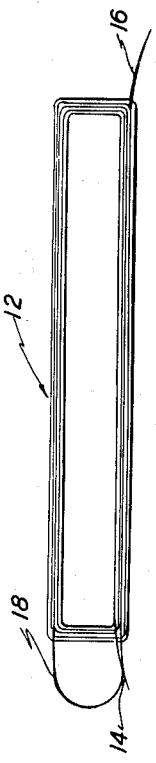
Fig. 1 is a schematic view illustrating my new winding method.

Referring to Fig. 1, a coil 12 is shown which has been wound by my new method. The coil 12 is wound in the same direction to provide several layers of wire turns. A lead-in wire 14 forms a part of the original turn. The final turn terminates in a lead-out wire 16.

During the winding process a portion of the wire is extended beyond a longitudinal end to provide a loop 18. This loop may occur at a point where an even number of layers have been completed and an odd-numbered layer just starting.

After the coil has been completely wound the loop 18 is severed. This provides two wires, the length of the first wire being from the original lead-in wire 14 to the severed point and the length of the second wire being from the severed point to the lead-out wire 16. The cutting of the loop 18 provides two extended wire portions 19 and 20 in addition to original lead-in wire 14. Portion 19 of the original loop 18 may then be bonded to the upper suspension (see Fig. 3). The original lead-in wire 14 is then connected to the portion 20 of the severed loop. Portion 19 is used as a new lead-in wire and a difference of potential applied across portion 19 and lead-out wire 16 will cause a net working turns equal to the difference of the length of the wire from portion 19 to the junction when compared to the length of the wire from the junction to lead-out wire 16.

Figure 2:
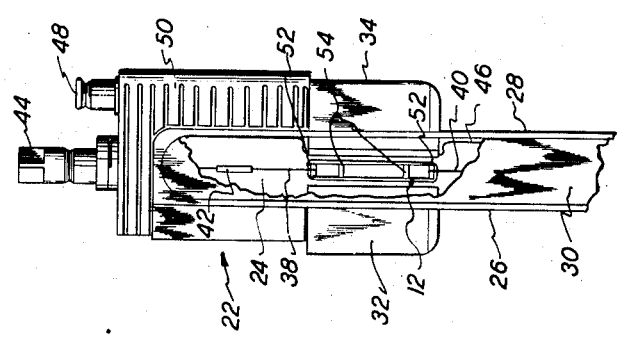
Fig. 2 is an elevational view illustrating a galvanometer using my new type coil.

A galvanometer constructed in accordance with my invention is shown in elevation in Fig. 2. The galvanometer comprises a casing 22 in the form of a square or rectangularly sectioned box, the length of which is many times its cross-sectional dimensions. The case comprises an elongated back strip 24 and two strips 26 and 28. A cover 30 of substantially the same shape as the back member 24 slidably engages in grooves (not shown) adjacent the front edges of the side members 26 and 28.

A pair of pole pieces 32, 34 are mounted through sides 26 and 28 respectively, of the case, defining a relatively narrow gap within the case symmetrically arranged about the longitudinal axis thereof. Pole pieces 32 and 34 extend outwardly from the side walls 26 and 28 and are adapted for engagement in a suitable magnet block (not shown). The elongated coil 12 is suspended in the gap between the pole pieces 32 and 34 by upper and lower suspension wires 38 and 40, respectively. The suspension wires are connected to the coil termini to provide electrical leads to the coil. A small rectangular mirror 42 is attached to the upper suspension wire in alignment with a window (not shown) in the side wall 26 of the case, whereby a beam of light may be directed to the mirror and reflected back through the window for sensing deflection of the coil 12.

The upper suspension wire is anchored to a terminal post 44, the manner of mounting the same through the end of the case 22 being conventional in this instance.

The lower suspension wire 40 is bonded to a lower suspension terminal. A fine wire lead 46 is also bonded at one end to the lower suspension terminal (not shown) conveniently by soldering, and is carried upwardly in the case for connection to a second external contact or terminal post 48 anchored in a terminal housing 50.

Figure 3:
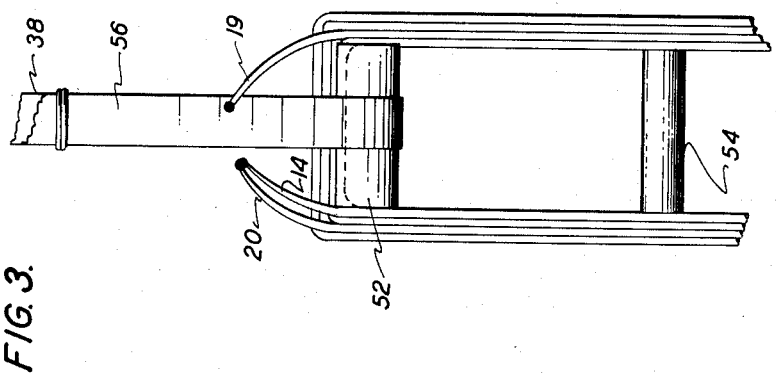
Fig. 3 is an enlarged view showing the connection of the galvanometer coil to the upper suspension means.

The various features of the invention which combine to result in a galvanometer of improved characteristics are best described with relation to Fig. 3. The coil comprises a multiplicity of turns of fine wire wrapped around oppositely located upper and lower bobbins 52. To maintain the proper coil symmetry, spacer pins 54 are interposed between the two sides of the coil in the region between the upper and lower bobbins 52. A loop 56 is formed at the lower end of the upper suspension means 38 and circumscribes the upper bobbin 52.

Wire 19 is bonded as by soldering to the loop 56, thus forming a terminal lead-in. The lead-in wire 14 is connected by soldering or another means to the portion 20 of the loop. By locating extensions 14 and 20 at the end of the coil 12 they can be connected at a point along the axis of the coil and hence do not change the static and dynamic balance of the galvanometer coil.

The advantages of constructing a galvanometer this way are as follows:

(1) The finished coil leads are at opposite ends as in a normal coil;

(2) The two leads that must be joined together are very close to each other so that joining them is simple and does not require a jumper;

(3) The joint required occurs at an end of the coil so that the joint does not increase the coil size on the sides where clearance between the coil and the pole pieces may be a problem;

(4) The mass unbalance due to the joint is minimized because the joint wires may be formed inward and close to the axis of rotation;

(5) The coil is wound with all turns in the same direction. Hence there is no need to reverse-wind, stop or otherwise depart from the normal winding procedure except to make the one loop 18 between particular layers.

A galvanometer has been constructed using this type of coil. The given factors in its design were $H = .64$
$f = 10$ c.p.s.
$R_{ext} = 350$ S was approaching $\dfrac{.5 \text{ inches}}{\text{microampere}}$ $R_g$ = about 20 ohms until the above technique was conceived and tested. The final figures were $S = \dfrac{.6177 \text{ inches}}{\text{microampere}}$ $R_g = 130$ ohms For higher natural frequencies a somewhat smaller gain is realizable.

I claim:

1. A method of producing an electrical coil having a high electrical resistance consisting of the steps of winding a length of wire in the same direction several times to provide several turns, severing the wire at a point between its ends to provide two wires, the length of the first wire being from the beginning of the original wire to the severed point and the length of the second wire being from the severed point to the end of the original wire, and joining the severed part of the second wire to the beginning of the original wire to form a junction so that when a voltage appears between the severed end of the first wire and end of the original wire the net working turns of the coil equals the difference of the length of the wire from one end of the wire to the junction when compared to the length of the wire from the junction to the other end of the wire.

2. A method of forming a galvanometer coil having a high electrical resistance consisting of the steps of winding a length of wire in the same direction several times to provide several layers of turns with a lead-in end and a lead-out end at opposite ends of the coil the turns being parallel to one another and to the longitudinal rotational axis of the coil, severing the wire at a point between its ends and adjacent the lead-in end to provide two wires, the length of the first wire being from the lead-in end to the severed point and the length of the second wire being from the severed point to the lead-out end, and joining the severed part of the second wire to the lead-in end to form a junction so that when a voltage appears between the severed end of the first wire and the lead-out end the net working turns of the coil equals the difference of the length of the wire from the lead-in end to the junction when compared to the length of the wire from the junction to the lead-out end.

3. A method of forming a galvanometer coil having a high electrical resistance consisting of the steps of undirectionally winding a length of wire around supporting means to form a plurality of loops with the lead-in end of the wire extending from the supporting means, forming a loop larger than the preceding loops to extend adjacent to the lead-in end, unidirectionally winding the remaining length of wire to form a plurality of loops with the lead-out end of the wire extending beyond the supporting means opposite to the lead-in end, severing the larger loop to form a first length of wire extending from the lead-in end to the severed point and a second length of wire extending from the severed point to the lead-out end, and joining the second length of wire at its severed point to the lead-in end so that when electrical signal means are joined to the severed point of the first length of wire and the lead-out end respectively the net working turns of the coil equals the difference in length between the first length of wire and the second length of wire.

4. Method in accordance with claim 3 wherein the larger loop is formed where an even number of loops have been completed and an odd-numbered loop is beginning.

5. In a galvanometer having a case and upper and lower suspension means anchored to opposite ends of the case, a conductive coil suspended between the upper and lower suspension means comprising a plurality of unidirectional loops of wire having a lead-in end and a lead-out end, a severed intermediate loop providing first and second lengths of wire of unequal length extending from the point of severance to the lead-out end and lead-in end respectively, the severed end of the first length of wire joined to one suspension means, the severed end of the second length of wire joined to the lead-in end, and the lead-out end joined to the other suspension means.

6. Galvanometer in accordance with claim 5 wherein the first length of wire has an even number of loops.

References Cited in the file of this patent

UNITED STATES PATENTS

| | | |
|---|---|---|
| 400,980 | Weston | Apr. 9, 1889 |
| 1,200,233 | Preston | Oct. 3, 1916 |
| 2,122,894 | Sager | July 5, 1938 |
| 2,691,142 | Richardson | Oct. 5, 1954 |